United States Patent [19]
Kulczycki

[11] Patent Number: 5,342,130
[45] Date of Patent: Aug. 30, 1994

[54] BEARING RETAINER RING

[75] Inventor: Stanley Kulczycki, Sterling Heights, Mich.

[73] Assignee: The Budd Company, Troy, Mich.

[21] Appl. No.: 955,104

[22] Filed: Oct. 1, 1992

[51] Int. Cl.⁵ .............................................. F16C 19/38
[52] U.S. Cl. .................................... 384/585; 384/542
[58] Field of Search .................. 384/585, 589, 544, 542

[56]  References Cited
U.S. PATENT DOCUMENTS

| | | |
|---|---|---|
| 1,842,971 | 1/1932 | Hughes . |
| 1,900,101 | 3/1933 | Frank . |
| 2,312,361 | 3/1943 | Sanford . |
| 2,683,066 | 7/1954 | Pusey . |
| 3,690,399 | 9/1972 | Bokovoy et al. . |
| 4,618,159 | 10/1986 | Kozyra et al. . |

Primary Examiner—Lenard A. Footland
Attorney, Agent, or Firm—Harness, Dickey & Pierce

[57]  ABSTRACT

A wheel hub assembly for a non-driven axle including a hub, a bearing retainer ring and a bearing. The bearing retainer ring is secured to the hub by engagement of the wheel mounting studs with the hub. A portion of the bearing retainer ring directly engages and positively provides an axial retention load on the bearing. The resulting structure is a compact and light weight wheel hub assembly having simplified, cost efficient construction.

5 Claims, 1 Drawing Sheet

BEARING RETAINER RING

BACKGROUND AND SUMMARY OF THE INVENTION

The invention relates to wheel hub assemblies in general and to a wheel hub assembly having a bearing retainer ring in particular.

Wheel hub assemblies found on the non-driven axles of motor vehicles generally include the wheel hub itself and a bearing. A press-fit mounting is typically used to position the bearing within an inner bore that extends through the hub body. The bearing inner race is fixed to the axle whereas the outer race rotates with the vehicle wheel. Because of the vibration and suspension loads that are imparted through the wheel hub assembly during operation, it is necessary to further secure the bearing in the hub, usually through the use of an element producing positive mechanical retentions. Known positive retention elements typically provides a pre-load, axial retention force onto the bearing.

One popular method of retaining the wheel bearing is to use a snap ring or C-clip. The snap ring is installed into an undercut groove which has been machined into the inner bore of the hub. However, the undercut groove is a difficult and costly feature to machine into the hub. Additionally, material chips from the machining process can become entrapped within the undercut groove and impede assembly of the bearing and snap ring.

Another mechanism for retaining and providing a pre-load retention force on the bearing utilizes a bearing retainer ring or bracket. Dedicated fasteners secure the bracket to the wheel mounting flange of the hub. A spacer or intermediate member is positioned between the bearing and bracket and transmits axial retention loads from the bracket to the bearing.

One limitation of the above prior retaining designs is that use of the dedicated fasteners and intermediate members increase the overall weight of the wheel hub assembly. Another limitation is that the dedicated fasteners and intermediate members increase the bulk of the wheel hub assembly. Furthermore, the use of dedicated fasteners requires additional machining of the wheel mounting flange which results in increased production costs. Typically, this machining produces additional bores drilled or otherwise formed in the wheel mounting flange. The present invention is a direct improvement over these bearing retainer rings.

It is a principal object of this invention to provide for a wheel hub assembly in which axial retention loads are maintained on the bearing. As such, the present invention overcomes the limitations of the prior bearing retainer methods.

It is also an object of this invention to provide a wheel hub assembly which is cost efficient to produce. In reducing costs, the present invention simplifies the production and assembly processes by reducing the number of production steps and the number of individual parts used in wheel hub assembly. A related object is to reduce the overall weight and bulk of the wheel hub assembly.

In achieving the above and other objects, the present invention provides a wheel hub assembly for a non-driven axle. Generally, the assembly includes a hub, a bearing and a retaining ring.

The hub includes a cylindrical main body having a central bore extending axially therethrough. A portion of the central bore defines a bearing seat which receives the pre-set and prelubricated bearing. A wheel mounting flange, including wheel mounting bores spaced around the flange, extends radially outward from the main body of the hub. The bearing retainer ring is secured to the hub by the engagement of the wheel mounting studs in the wheel mounting bores. A loading portion of the retainer ring directly contacts and provides a positive axial retention load on the bearing.

The present invention eliminates the dedicated fasteners and spacers associated with the prior designs and results in a structure that provides for a compact and light weight wheel hub assembly which is simplified in construction and cost effective to produce.

Additional benefits and advantages of the present invention will become apparent to those skilled in the art to which this invention relates from the subsequent description of the preferred embodiments and the appended claims taken in conjunction with the accompanying drawing.

DETAILED DESCRIPTION OF THE PREFERRED EMBODIMENT

Figure 1:
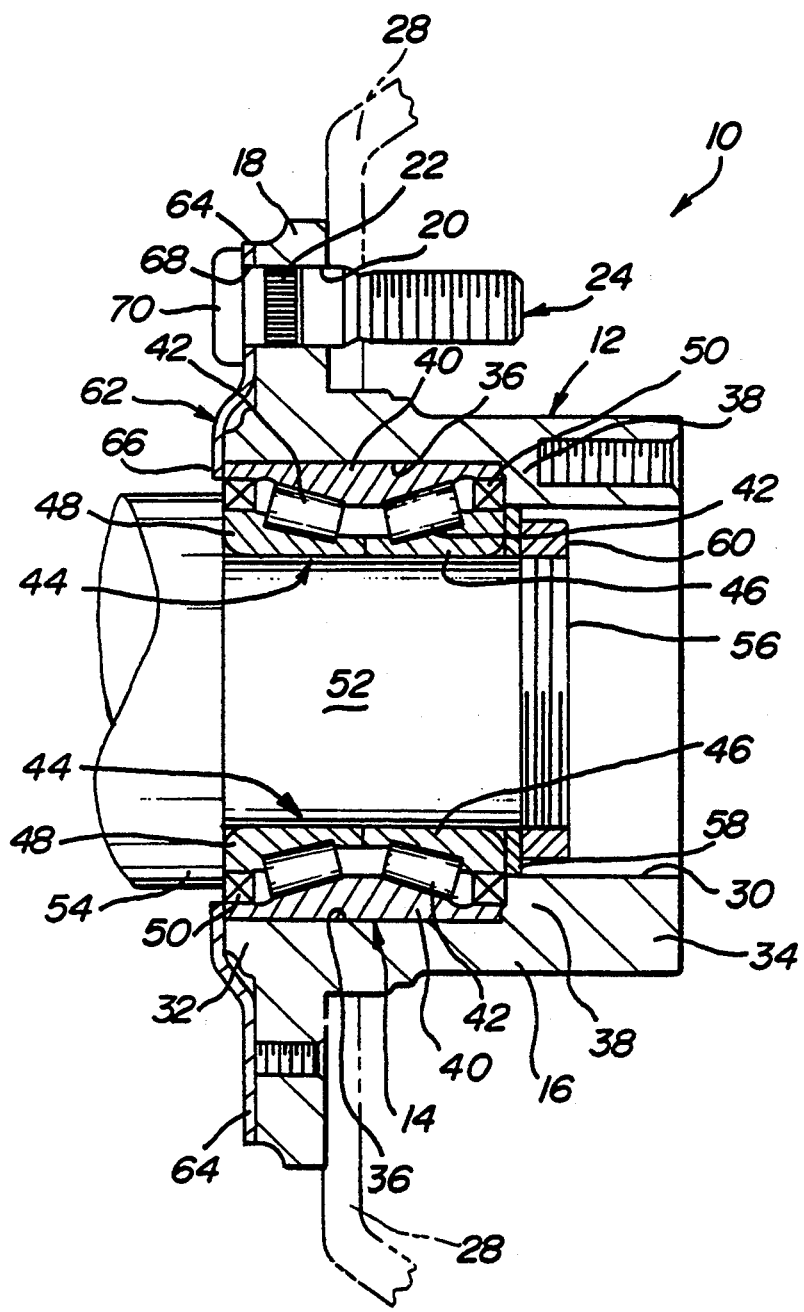
FIG. 1 is a longitudinal sectional view taken through a wheel hub assembly embodying the principles of the present invention.

Referring to the drawing, a wheel hub assembly embodying the principles of the present invention is shown in FIG. 1 and generally designated at 10. The wheel hub assembly 10 is primarily comprised of a hub 12, a bearing 14 and a bearing retainer ring 62.

The hub 12 includes a generally cylindrical main body or barrel 16 from which a wheel mounting flange 18 radially extends. A rotor or drum, not shown, may be integrally formed with the hub 12 or may be separately mounted to the hub assembly 10. Wheel mounting stud bores 20 are provided at spaced intervals circumferentially about the wheel mounting flange 18. In order to retain a wheel mounting stud 24, the bores 20 are sized to engage a knurled portion 22 on each stud 24. The wheel mounting studs 24 also include a threaded end 26 which will receive a nut (not shown) to secure a wheel 28 to the wheel hub assembly 10.

The main barrel 16 of the hub 12 also includes a central, axially extending bore 30. The bore 30 terminates at an inboard end 32 and an outboard end 34 of the hub 12.

Formed with the bore 30 and adjacent to the inboard end 32 of the hub 12, is a bearing seat 36. The bearing seat 36 is a substantially cylindrical surface of the bore 30, defining an inner diameter, and recessed into the hub 12. The bearing 14 is press-fit into engagement with the bearing seat 36. A shoulder 38, formed at the juncture of the internal bore 30 and the bearing seat 36, axially limits and prevents over insertion of the bearing 14 into the bearing seat 36. The shoulder 38 is axially recessed from the inboard end 32 of the hub 12 at a distance which corresponds to the width of the bearing 14. This permits the opposing or inboard end of bearing 14 to be mounted substantially flush with the inboard end 32 of the hub 12.

When press-fitted into the hub 12, an outer race or cup 40 of the bearing 14 is in surface-to-surface engagement with the bearing seat 36 and the shoulder 38. Rollers 42 of the bearing 14 engage the cup 40 and an inner race or cone 44, which is further comprised of an outboard cone 46 and an inboard cone 48. Being a permanently lubricated bearing 14, seals 50 are mounted between the inner and the outer races 40 and 44.

The inner race 44 defines a central opening which is configured to receive the axle 52. To engage the inboard cone 48 and prevent over-insertion of the axle 52, a shoulder 54 is formed on the axle 52.

As seen in the Figure, the inserted end of the axle 52 is threaded as designated at 56. A nut 60 engaged on the threaded end 56 of the axle 52 captures and secures the wheel hub assembly 10, in particular the bearing 14, between the shoulder 54 mentioned above and a washer 58.

Because of the vibration and suspension loads that are imparted through the wheel hub assembly 10 during operation, a bearing retainer ring 62 is used to provide a positive axial retention load onto the bearing 14 and further secure it within the hub 12. Because this securement is achieved through the use of the studs 24, the bearing is secured during mounted of the wheel hub assembly 10 onto the axle 52 thereby eliminating the possibility of the bearing 14 disengaging during production handling.

The bearing retainer ring 62 is an integrally formed (cast, stamped or otherwise) ring-like structure which includes a radially outward mounting portion 64 and a radially inward retaining portion 66. The retaining portion 66 defines a central opening having an inner diameter which is less than the diameter of the bearing seat 36.

The mounting portion 64 extends circumferentially about and is in contact with the wheel mounting flange 18. Mounting bores 68 are defined in the mounting portion 64 and correspond with the bores 20 of the wheel mounting flange 18. As such, heads 70 on the wheel mounting studs 24 will secure the bearing retainer ring 62 to the hub 12 when the studs 24 are press-fitted into the wheel mounting bores 20. It can be seen that the present invention eliminates the need for dedicated fasteners in securing the bearing retainer 62 to the hub 12, thereby reducing the weight, size and complexity of the wheel hub assembly 10.

The retaining portion 66 of the bearing retainer ring 62 is configured to directly contact and provide an axial retention pre-load against the outer race 40 of the bearing 14. This construction eliminates spacers, reduces size and further decreases weight and complexity.

From the above it can be seen that the wheel hub assembly 10, including the bearing retainer ring 62, of the present invention provides for a less complex and more compact structure having reduced weight, all of which are advances over prior designs.

While the above description constitutes the preferred embodiment of the present invention, it will be appreciated that the invention is susceptible to modification, variation and change without departing from the proper scope and fair meaning of the accompanying claims.

What is claimed is:

1. A wheel hub assembly for a non-driven axle comprising:
   a hub including a generally cylindrical main body and a central bore extending therethrough, a portion of said central bore defining a bearing seat, said hub also including a wheel mounting flange extending radially outward from said main body, said wheel mounting flange having wheel mounting bores defined therein and having opposing faces;
   wheel mounting studs disposed within said wheel mounting bores having enlarged heads on one opposing face of said wheel mounting flange and a threaded shaft extending from the other opposing face;
   a bearing having an inner race and an outer race, said bearing being positioned within said central bore in engagement with said bearing seat; and
   a bearing retainer ring including a mounting portion having at least one ring mounting bore corresponding to one of said wheel mounting bores, said bearing retainer ring being secured to said wheel mounting flange by at least one of said wheel mounting studs extended through both said ring mounting bore and said corresponding wheel mounting bore with said bearing retainer ring being disposed between said enlarged head of said at least one of said wheel mounting studs and said wheel mounting flange, said bearing retainer ring also having a retaining portion directly engaging said bearing, said retaining portion acting upon said bearing and providing a preload onto said bearing to assist in retaining said bearing in said bearing seat whereby said bearing is axially retained in said wheel hub assembly by application of a positive retention load solely by the addition of said bearing retainer ring to said wheel hub.

2. A wheel hub assembly according to claim 1 wherein said outer race is in engagement with said bearing seat.

3. A wheel hub assembly according to claim 1 wherein said retaining portion engages said bearing outer race.

4. A wheel hub assembly according to claim 1 wherein said retaining portion directly engages said outer race.

5. A wheel hub assembly according to claim 1 wherein said bearing seat includes a shoulder limiting axial insertion of said bearing thereinto.

* * * * *